Patented Apr. 3, 1934

1,953,320

UNITED STATES PATENT OFFICE 1,953,320

EYE PROTECTOR

George P. Thomas, Glenshaw, Pa.

Application February 3, 1933, Serial No. 655,044

4 Claims. (Cl. 2—13)

This invention relates to an eye protector, and more particularly to a shield devised for the use of automobile drivers to protect their eyes from the headlight glare of approaching automobiles when driving at night.

All automobile drivers who have driven at night have at one time or another, if not on numerous occasions, been blinded by the headlight glare of an approaching automobile, which is considered one of the worst hazards of driving and is the cause of much eye strain and injury.

With this in mind it is the object of this invention, generally stated, to provide an improved eye shield which reduces this hazard to a minimum.

A more particular object is to provide an eye shield for such purpose which is simple of construction, efficient and easy to use, and which affords the user a perfectly clear field of vision of sufficient area directly ahead of the automobile which he is driving, as well as to both sides, to insure his protection and at the same time protect his eyes against injury.

Figure 1:
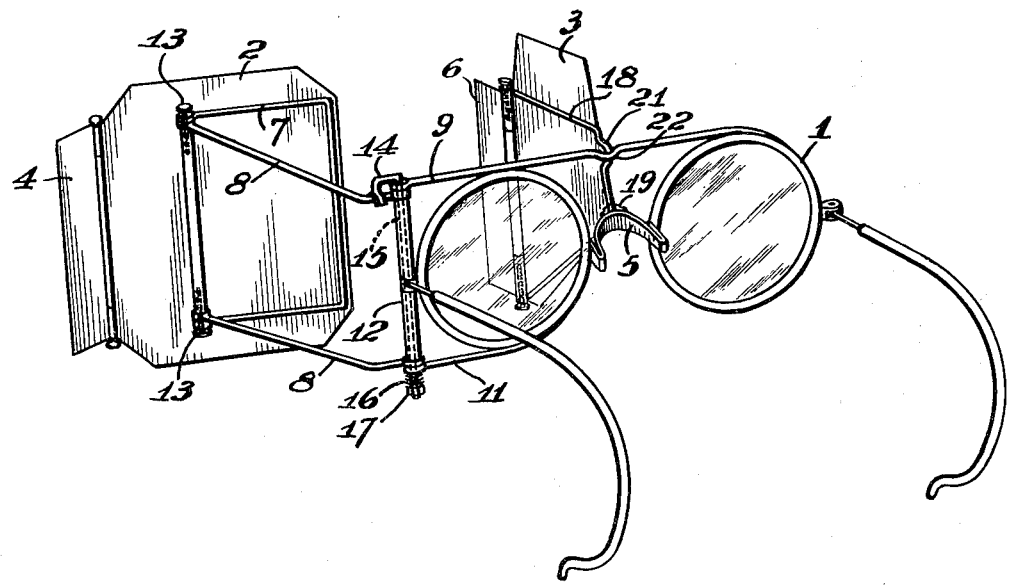
Figure 2:
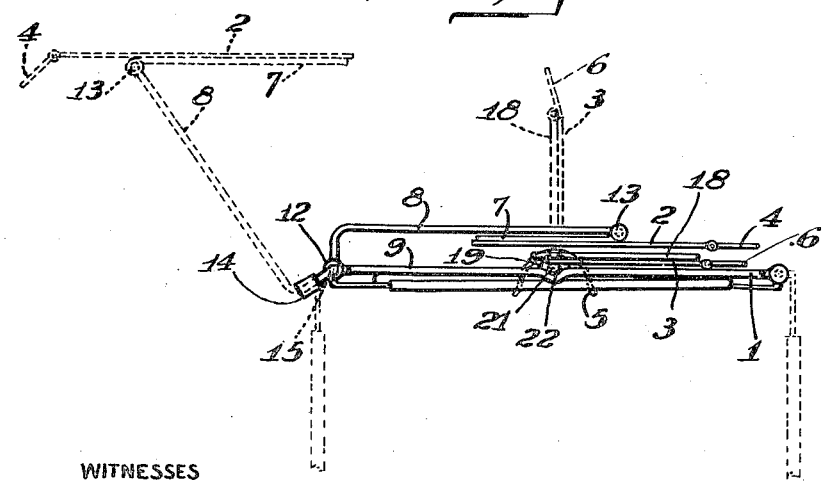

These and various other objects, as well as the various other novel features and advantages of the invention, will be apparent when the following detailed description is read in conjunction with the accompanying drawing, of which Fig. 1 is a perspective view of a single embodiment of the invention, and Fig. 2 a plan view of the same showing it closed or folded in full line and open ready for use in dotted line.

Referring in detail to the drawing, the numeral 1 designates an ordinary pair of bifocular spectacle frames which, as shown, may be used as a support for the shield assembly proper, although, as will presently be apparent, other forms of supports may be employed. According to the invention two shields 2 and 3 constitute the main elements of the assembly. The first of these is mounted on the left side of the supporting frame 1 at a distance therefrom and in parallel relation therewith and with its right edge sufficiently spaced from the center line of vision of the left eye to afford the user a full view of the road or street ahead of his automobile and its left edge spaced sufficiently from the right to give the user an adequate field of vision at the left side of the road, whereby insuring his sight of approaching automobiles as they draw close to him. To vary the field shaded by this shield 2 at the will of the user an adjustable section 4 is hinged to the left edge, although such section may be dispensed with if desired.

Through the use of such a shield a driver may by a slight turn of his head completely shut off the headlight glare of an approaching automobile while retaining a perfectly clear vision of the road at the right of the approaching machine, as well as at the left in the rear of the shield. To carry out its purpose the shield may be completely opaque. However, it is preferably made of some suitable material such as colored cellophane or the like which will permit the user to see the approaching automobile, but will reduce the glare of the light to such an extent that it will not in any way impair his sight or injure his eyes.

The second-mentioned shield 3 is provided to prevent the sight or vision of the right eye overlapping that of the left eye in the field shaded by the first-mentioned shield 2, thus affording a sharply defined and perfectly clear and unconfused field of vision to the right of the headlights of an approaching machine. Toward this end this shield 3 is attached to the nose bridge 5 of the frame 1 and projected outward therefrom in a vertical plane disposed at right angles to the plane of the shield 2 and midway between the eyes of the user. To properly accomplish its purpose it is provided with a length which restricts the field of vision of the right eye at the left to the same field that the left eye is restricted by the right edge of the shading shield 2. Hence when the user's head is turned to the right to shut off the glare of an approaching light both eyes focus on the same field of vision which, as will be readily appreciated, affords the most perfect vision. Because it is impossible to mount the two shields in the manner shown to fit all persons, an adjustable hinged section 6 is provided on the outer end of the shield 3 to permit various users adjusting the latter shield to accommodate their eyes.

As stated hereinbefore, and as will be apparent to those skilled in the art, the shield assembly provided by this invention may be mounted otherwise than as shown. For example, it may be mounted in a suitable support attached to the roof of the automobile in a manner permitting it to be readily positioned before the driver when desired. In the embodiment illustrated, however, the glare-protecting shield 2 is secured to a frame 7 provided to give it rigidity and strength, which is secured to the supporting frame 1 by a pair of side rods 8. To strengthen the supporting frame 1 so that it will safely carry the load of the shield 2 upper and lower crossbars 9 and 11 are secured to the top and bottom of the bifocular frames and their left-hand ends attached to a tubular section 12 which is secured to the left end of the frame 1, the rods 8 being attached to the opposite ends of this tubular section.

To permit the shading shield 2 being folded upon the frame 1 in the manner shown in Fig. 2 to facilitate the assembly being carried when not in use, the rods 8 are bent adjacent the frame, as shown by the dotted lines in Fig. 2, and pivotally attached to the shield frame 7, as well as to the end section 12 of the frame. To hold the shade 2 in its operative position when in use, and to permit its being folded, screw clamps 13 are provided on the frame 7 where the rods 8 are attached, and a latch 14 is provided at the top of the tubular section 12, the latter being secured to a non-circular shaft 15 which is passed through a similarly shaped opening in the tubular section 12. On the bottom of this shaft there is mounted a helical spring 16 which engages the bottom of section 12 and a nut 17. Hence the latch which is adapted to engage the upper rod 8 and hold it in its operative position is constantly urged into such engagement by the spring 16, which allows the shaft to be raised to release the latch when it is desired to fold the assembly.

To permit folding of the intermediate shade 3, it is mounted on a frame 18 which is pivotally attached at 19 to the nose bridge 5 of frame 1, and to hold it in its operating position its frame 18 is provided with a crank-like development 21 on it which is adapted to resiliently engage in a groove 22 in the upper cross-bar 9 when the shade is in its outer position. This latter shield is preferably made completely opaque and provided with dull non-reflecting surfaces so that the light rays impinging against it will not be reflected into the user's eyes.

It will be appreciated that in the embodiment of the invention illustrated lenses may or may not be used in the frames 1 as desired, and further, that where the protector is intended for use in countries where the passing of approaching automobiles is on the right, rather than the left, the mounting of the shading shield 2 will be on the right side of the supporting frame instead of on the left.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. An eye protector comprising a supporting frame adapted to be mounted in front of the user's eyes, a shield carried by said frame disposed at right angles to the line of vision and with its inner edge to the left of the user's left eye and spaced at a distance from the frame, and a second shield attached to the mid-section of said frame and projected therefrom in a plane disposed substantially at right angles to the plane of the first-mentioned shield.

2. An eye protector comprising a supporting frame adapted to be mounted in front of the user's eyes, a shield carried by said frame spaced at a distance in front of and with its inner edge located to the left of the center of the user's left eye, and arranged to intersect the field of the user's vision, a second shield carried by said frame at the left side of the field of the user's right eye and arranged in a plane substantially at right angles to the plane of the first-mentioned shield and being disposed to limit the field of vision of the user's right eye to the left to coincide with that of the left eye as determined by the right edge of the first-mentioned shield.

3. An eye protector comprising a frame adapted to be mounted in front of the user's eyes, a shield carried by said frame at a distance in front of and to the left of the center of the user's left eye and arranged to intersect the field of the user's vision, an adjustable section mounted on the left end of such shield for varying the field shaded thereby, a second shield carried by said frame at the left side of the field of the user's right eye and arranged in a plane substantially at right angles to the plane of the first-mentioned shield and adapted to limit the field of vision of the user's right eye to the left to coincide with that of his left eye as determined by the right edge of the first-mentioned shield, and an adjustable section attached to the outer end of said latter shield for varying the left margin of the field of vision of the right eye determined thereby.

4. An eye shield comprising a supporting frame adapted to be mounted on the user's head in front of his eyes, a collapsible shield carried by said frame and adapted to be supported at a distance spaced in front of said frame and with its inner edge to the left of the center of the user's left eye and arranged to intersect the field of the user's vision, and a second collapsible shield carried by said frame at the left side of the field of the user's right eye and adapted to be positioned for use in a plane substantially at right angles to the plane of the first-mentioned shield and to limit the field of vision of the user's right eye to the left to coincide with that of the left eye as determined by the right edge of the first mentioned shield.

GEORGE P. THOMAS.